(12) United States Patent
Mudd

(10) Patent No.: US 6,443,174 B2
(45) Date of Patent: Sep. 3, 2002

(54) FLUID MASS FLOW CONTROL VALVE AND METHOD OF OPERATION

(76) Inventor: Daniel T. Mudd, 333 Huntleigh Manor Dr., St. Charles, MO (US) 63303

( * ) Notice: Subject to any disclaimer, the term of this patent is extended or adjusted under 35 U.S.C. 154(b) by 0 days.

(21) Appl. No.: 09/900,829

(22) Filed: Jul. 6, 2001

Related U.S. Application Data

(60) Provisional application No. 60/216,928, filed on Jul. 8, 2000.

(51) Int. Cl.$^7$ ................................................ G05D 7/06
(52) U.S. Cl. ...................... 137/10; 137/487.5; 137/2; 137/486; 137/599.13; 251/11; 60/528
(58) Field of Search .............................. 137/2, 10, 486, 137/487.5, 599.13; 251/11, 129.17, 129.2; 60/528

(56) References Cited

U.S. PATENT DOCUMENTS

| | | |
|---|---|---|
| 2,666,297 A | 1/1954 | Skousgaard |
| 3,271,994 A | 9/1966 | Fournier et al. |
| 3,335,748 A | 8/1967 | Klemm et al. |
| 3,559,482 A | 2/1971 | Baker et al. |
| 3,570,807 A * | 3/1971 | Sturman et al. ............... 251/65 |
| 3,807,456 A | 4/1974 | Colletti |
| 3,814,541 A | 6/1974 | Dent et al. |
| 3,841,520 A | 10/1974 | Bryant et al. |
| 3,910,113 A | 10/1975 | Brown |
| 4,015,626 A | 4/1977 | Thordason |
| 4,096,746 A | 6/1978 | Wilson et al. |
| 4,118,009 A | 10/1978 | Chmura |
| 4,203,465 A | 5/1980 | Rissi |
| 4,253,156 A | 2/1981 | Lisle et al. |
| 4,275,752 A | 6/1981 | Collier et al. |
| 4,315,523 A | 2/1982 | Mahawill et al. |
| 4,327,757 A | 5/1982 | Weevers |
| 4,406,161 A | 9/1983 | Locke et al. |
| 4,462,915 A | 7/1984 | Friedman |
| 4,565,212 A | 1/1986 | Klein et al. |

(List continued on next page.)

FOREIGN PATENT DOCUMENTS

| | | |
|---|---|---|
| EP | 0468793 A2 | 1/1992 |
| EP | 0689040 A2 | 12/1995 |
| WO | WO 87/00267 | 1/1987 |

OTHER PUBLICATIONS

Sheriff, David, "Mass Flow Controller Features Digital Calibration," Solid State Technology, Feb. 1993, No. 6, pp. 33–35, Tulsa, OK, US.

Gallant, John, "Sensors offer fast response times," E.D.N.— Electrical Design News 34, May 25, 1989, pp. 55, 57, 58, 60, 62, 64, 66, 68, No. 11, Newton, MA, US.

(List continued on next page.)

Primary Examiner—Michael Powell Buiz
Assistant Examiner—Ramesh Krishnamurthy
(74) Attorney, Agent, or Firm—Randall C. Brown; Haynes and Boone, L.L.P.

(57) ABSTRACT

A fluid mass flow control apparatus, particularly adapted for use in controlling fluid flow to semiconductor fabrication processes, comprises a tubular body part having inlet and outlet fittings and a bore extending therethrough and supporting a valve seat in the bore. A closure member is connected to an arm which extends laterally through a tubular spigot portion of the body part. The body part has a reduced thickness wall at the spigot portion to allow elastic deflection of the wall and movement of the arm to control the position of the closure member. An elongated tube or rod actuator on which a resistance heating coil is supported is operably connected to a control system for heating the actuator to move the arm to control flow of fluid through the apparatus. A flow restrictor is mounted upstream of the valve seat and a mass flow sensor is in communication with the passage to provide a mass flow rate signal to the control system.

26 Claims, 4 Drawing Sheets

U.S. PATENT DOCUMENTS

| | | | |
|---|---|---|---|
| 4,576,043 A | | 3/1986 | Nguyen |
| 4,589,440 A | | 5/1986 | Panet |
| 4,687,020 A | * | 8/1987 | Doyle ........................ 137/486 |
| 4,718,443 A | | 1/1988 | Adney et al. |
| 4,741,359 A | | 5/1988 | Siebald |
| 4,796,651 A | | 1/1989 | Ginn et al. |
| 4,858,643 A | | 8/1989 | Vavra et al. |
| 4,888,117 A | | 12/1989 | Brown et al. |
| 4,904,285 A | | 2/1990 | Yamada et al. |
| 4,918,995 A | | 4/1990 | Pearman et al. |
| 5,003,810 A | | 4/1991 | Jepson et al. |
| 5,052,363 A | | 10/1991 | Stiles |
| 5,062,446 A | | 11/1991 | Anderson |
| 5,080,131 A | | 1/1992 | Ono et al. |
| 5,100,100 A | * | 3/1992 | Benson et al. ......... 251/129.06 |
| 5,100,551 A | | 3/1992 | Pall et al. |
| 5,114,447 A | | 5/1992 | Davis |
| 5,123,439 A | | 6/1992 | Powers |
| 5,129,418 A | | 7/1992 | Shimomura et al. |
| 5,142,483 A | | 8/1992 | Basham et al. |
| 5,159,951 A | | 11/1992 | Ono et al. |
| 5,161,576 A | | 11/1992 | Hekkert et al. |
| 5,187,972 A | | 2/1993 | DeFriez |
| 5,190,068 A | | 3/1993 | Philibin |
| 5,280,773 A | | 1/1994 | Henkel |
| 5,285,673 A | | 2/1994 | Drexel et al. |
| 5,297,427 A | | 3/1994 | Shambayati |
| 5,311,762 A | | 5/1994 | Drexel |
| 5,325,705 A | | 7/1994 | Tom |
| 5,329,966 A | | 7/1994 | Fenimore et al. |
| 5,359,878 A | | 11/1994 | Mudd |
| 5,419,133 A | * | 5/1995 | Schneider .................... 251/11 |
| 5,445,035 A | | 8/1995 | Delajoud |
| 5,487,771 A | | 1/1996 | Zeller |
| 5,511,585 A | | 4/1996 | Lee, II |
| 5,542,284 A | | 8/1996 | Layzell et al. |
| 5,549,272 A | | 8/1996 | Kautz |
| 5,583,282 A | | 12/1996 | Tom |
| 5,624,409 A | | 4/1997 | Seale |
| 5,660,207 A | * | 8/1997 | Mudd ........................ 137/486 |
| 5,730,181 A | | 3/1998 | Doyle et al. |
| 5,804,717 A | | 9/1998 | Lucas |
| 5,816,285 A | | 10/1998 | Ohmi et al. |
| 5,865,205 A | * | 2/1999 | Wilmer .................... 137/487.5 |
| 5,868,159 A | | 2/1999 | Loan et al. |
| 5,904,170 A | | 5/1999 | Harvey et al. |
| 5,911,238 A | | 6/1999 | Bump et al. |
| 5,917,066 A | | 6/1999 | Eisenmann et al. |
| 5,918,616 A | | 7/1999 | Sanfilippo et al. |
| 5,944,048 A | * | 8/1999 | Bump et al. ............. 137/487.5 |
| 5,970,801 A | | 10/1999 | Clobanu et al. |
| 5,975,126 A | | 11/1999 | Bump et al. |
| 5,988,211 A | | 11/1999 | Cornell |
| 6,026,847 A | | 2/2000 | Reinicke et al. |
| 6,080,219 A | | 6/2000 | Jha et al. |
| 6,119,710 A | | 9/2000 | Brown |
| 6,152,162 A | | 11/2000 | Balazy et al. |

OTHER PUBLICATIONS

Drexel, Charles F., "Digital mass flow controllers," Solid State Technology, Jun. 1993, No. 6, pp. 73, 75, Tulsa, OK, US.

MGB 1000 Micro Gas Blender, Trace Analytical, Menlo Park, CA (Undated).

Redwood Microsystems, report.html@me210abc.standford.edu, Spring, Oct. 2, 1997.

R&D Magazine, Sep. 1997, "Back to Basics—Vacuum Technology", p. 81.

Semiconductor International, "Innovative Gas Handling Technology" (Undated).

Cobb, Jr. James Stanley and Stutler, Stephen Charles, Defensive Publication for Variable Flow Restricting Apparatus, 857 O.G. 1039, published Dec. 24, 1968.

Mott Industrial, Porous metal flow restrictors. High strength. Wear resistant. Clog Free. Jun. 1997.

Mott Industrial, Mott Precision Porous Metal Flow Restrictors, Engineering and Product Guide, 3/97.

Mott High Purity, Porous Metal Flow Restrictors, 6/96.

Redwood Microsystems, Flow–istor Specifications, 1996.

* cited by examiner

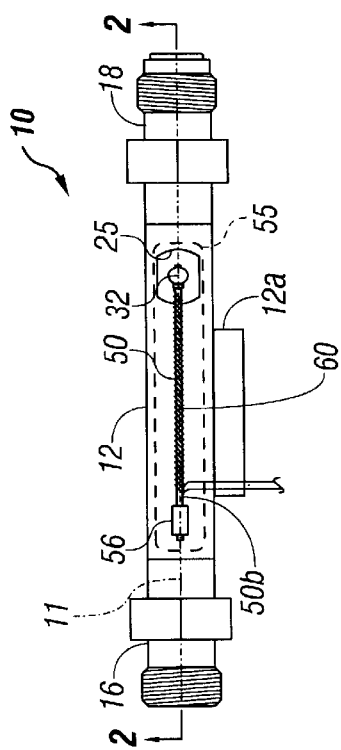
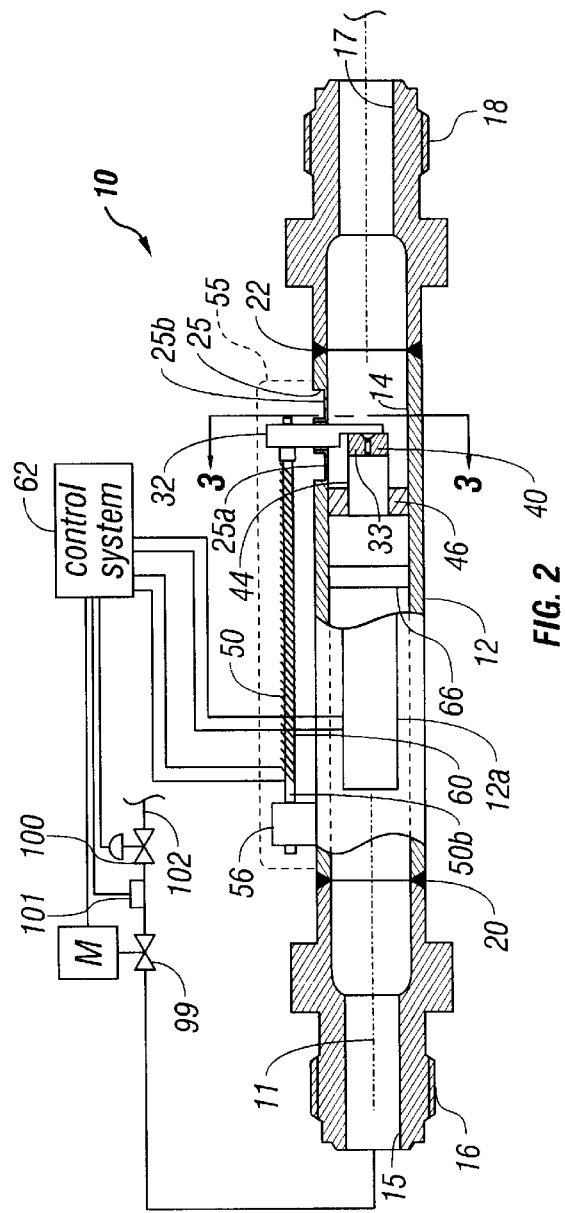

FLUID MASS FLOW CONTROL VALVE AND METHOD OF OPERATION

CROSS REFERENCE TO RELATED APPLICATION

This Application claims the priority of U.S. Provisional Patent Application Serial No. 60/216,928 filed Jul. 8, 2000.

BACKGROUND OF THE INVENTION

Typical fluid mass flow control valves or so called mass flow controllers of the type useful in the semiconductor manufacturing industry are required to be relatively precise instruments. Known types of fluid mass flow controllers are typically constructed by machining the valve body from a solid block of corrosion resistant dense metal. This type of fabrication results in the significant removal of material to generate the flow passages and mounting details for the valve seat and actuator and seals required to isolate the valve components from the gas flow stream. After the significant amount of machining required in prior art fluid mass flow controllers, the machine finished parts are required to be mechanically and electro polished to improve surface finish and corrosion resistance.

Still further, certain known types of fluid mass flow controllers utilize so called thermal actuators which are adapted to effect movement of a valve closure member by flexing a mechanical diaphragm connected to a branch tee or similar conduit part of the valve body. However, this type of construction is relatively expensive, complicated and produces uniform elastic deflection of a link connected to the closure member in all directions. Moreover, certain prior art types of fluid mass flow controllers utilize a thermal actuator comprising a hollow tube sealed at both ends and placed in the fluid flow stream. This arrangement complicates the control function since the temperature of the actuator tube is influenced by the flow of fluid (gas) which it is controlling. These arrangements typically result in slow response time required to reach a steady state flow for the controller. Still further, with prior art fluid mass flow controllers, the maximum displacement of the actuator is significantly affected by the specific gas that is being controlled by the controller. However, the present invention provides a fluid mass flow control valve and method of operation which overcomes several disadvantages of prior art fluid mass flow controllers.

BRIEF SUMMARY OF THE INVENTION

The present invention provides an improved fluid mass flow control valve or so-called controller and method of operation. In particular, the invention provides a fluid mass flow control valve of a type useful in controlling fluid mass flow in applications in the semiconductor processing industry.

In accordance with one important aspect of the present invention a fluid mass flow control apparatus is provided which utilizes a section of commercially available cylindrical tubing as a valve body and which is subject to relatively minor machining operations to provide a flexible wall portion of the valve body creating a pivot point at which a valve actuator arm is attached and is operable to move a valve closure member for controlling mass flow through the apparatus. The flexible wall portion is configured in such a way that elastic deflection is uniform in the desired directions of movement of the valve actuator arm but the flexible wall portion exhibits greater stiffness to resist deflection in unwanted directions.

In accordance with another aspect of the present invention, an improved fluid mass flow control apparatus is provided which comprises a unique actuator for moving a pivoting control arm operably engaged with a closure member. The fluid mass flow control apparatus utilizes relatively uncomplicated and inexpensive components for construction of the valve body, provides simplified fabrication required to construct the mass flow control apparatus and is adaptable to utilize different types of actuators for moving the actuator control arm. Although a thermal actuator is one preferred type, other types of valve actuators may also be used. Moreover, the actuator is not susceptible to heating or cooling effects of the fluid flowing through the flow control apparatus.

The fluid mass flow control apparatus of the invention also improves the response time for changing the mass flow rate of fluid being controlled by the apparatus. The present invention also provides a method of operation of a fluid mass flow control apparatus which provides more rapid and accurate responses to required fluid mass flow changes.

Those skilled in the art will further appreciate the advantages and superior features of the invention upon reading the detailed description which follows in conjunction with the drawing.

BRIEF DESCRIPTION OF THE SEVERAL VIEWS OF THE DRAWINGS

FIG. 1 is a top plan view of an improved fluid mass flow control apparatus in accordance with the invention;

FIG. 2 is a longitudinal central section view and schematic diagram of the fluid mass flow control apparatus shown in FIG. 1 and taken generally along the line 2—2 of FIG. 1;

DETAILED DESCRIPTION OF THE PREFERRED EMBODIMENTS

Figure 3:
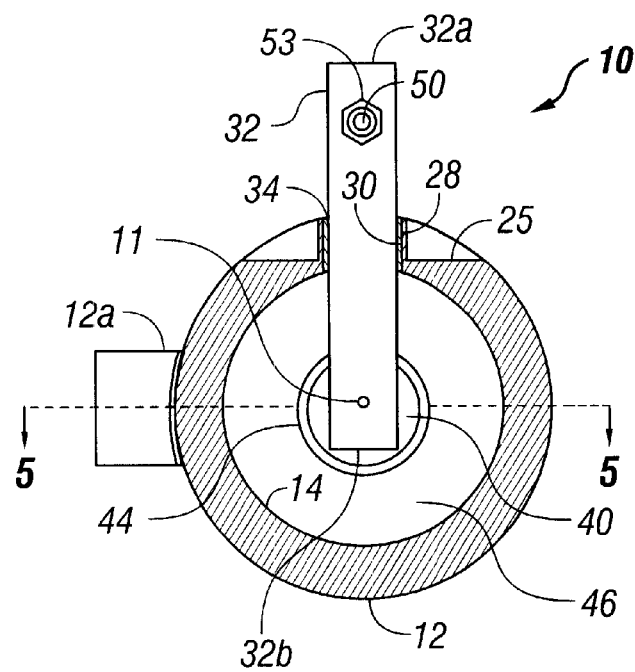
FIG. 3 is a section view taken generally along the line 3—3 of FIG. 2.

In the description which follows like elements are marked throughout the specification and drawing with the same reference numerals, respectively. The drawing figures are not necessarily to scale and certain elements and features may be shown in generalized or somewhat schematic form in the interest of clarity and conciseness.

Referring to FIGS. 1 and 2, there is illustrated a fluid mass flow control device or apparatus in accordance with the invention and generally designated by the numeral 10. The apparatus 10 is characterized by an elongated cylindrical tubular body part 12 having a longitudinal central cylindrical bore 14, FIG. 2, extending therethrough. Tubular body part 12 is, in one preferred embodiment, secured to opposed externally threaded tubular coupling members 16 and 18 at opposite ends of the body part by circumferential gastight welds 20 and 22, FIG. 2. Coupling members 16 and 18 include respective ports or flow passages 15 and 17 formed therein and in fluid flow communication with bore 14, as shown.

Figure 4:
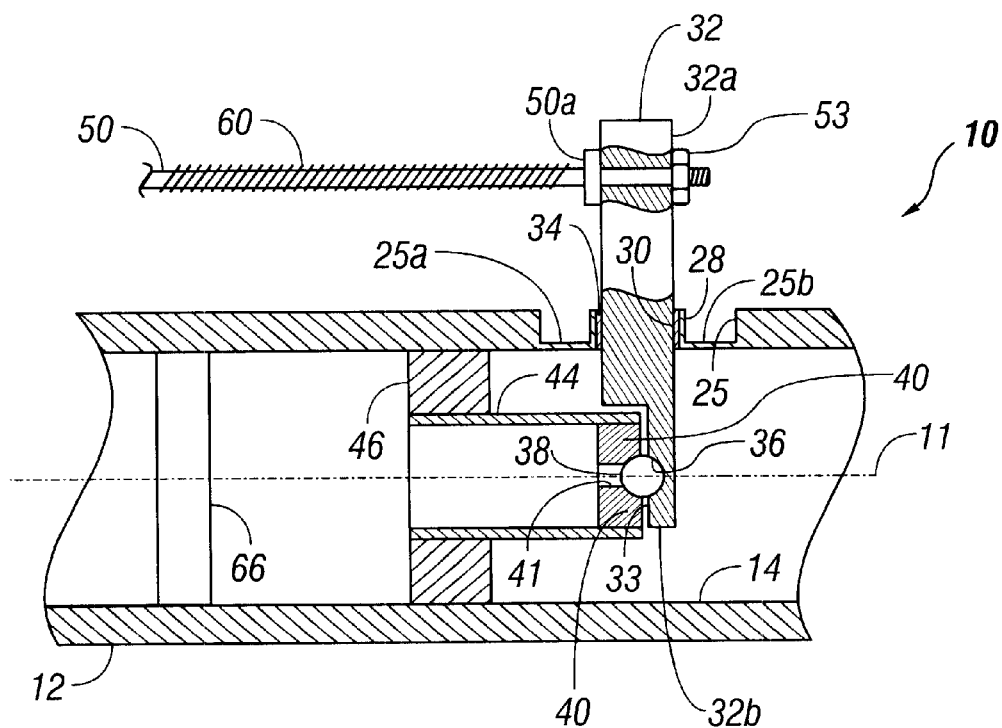
FIG. 4 is a detail view taken generally along the same line as the view of FIG. 2 on a larger scale and showing details of the controller closure member and actuator control arm.
Figure 6:
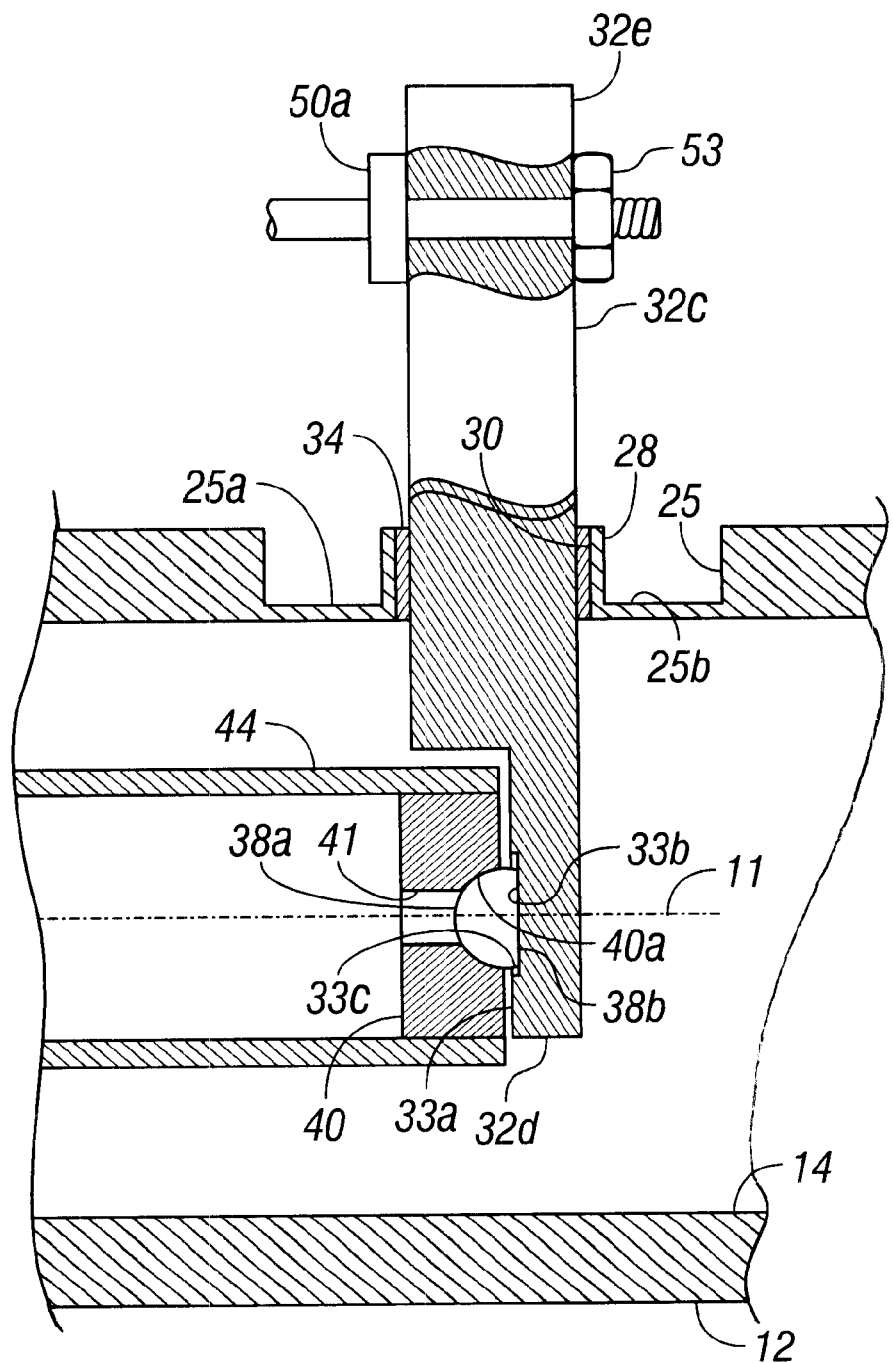
FIG. 6 is a detail section view of an alternate embodiment of an actuator control arm and closure member.

As shown in FIGS. 2 and 3, body part 12 is provided with a transversely extending recess 25, FIG. 2, to reduce the wall thickness of the body part. Recess 25 is configured so as to form, in particular, longitudinally extending thin wall portions 25a and 25b, FIG. 4, connected to a generally cylindrical thin walled radially outwardly projecting tubular spigot portion 28. Spigot portion 28 defines a cylindrical radially extending bore 30 which intersects the bore 14, see FIGS. 4 and 6, in particular. Recess 25 may be formed by machining away the outer wall portion of body part 12 circumferentially about the spigot 28 to form a planar surface defining in part the thin wall portions 25a and 25b, as shown in FIGS. 1, 4 and 6. The integral tubular spigot portion 28 is dimensioned to receive an elongated generally cylindrical actuator control arm member 32, FIGS. 1 through 4, which projects radially outwardly from the spigot portion and is secured thereto by a gas tight circumferential braze or weld 34, FIGS. 3 and 4. In the embodiment shown in FIG. 4, the arm 32 includes a notch 33, see FIG. 2 also, forming a flat surface in which an arcuate recess 36, FIG. 4, is formed for supporting a spherical ball closure member 38.

As shown in FIGS. 2, 3 and 4, closure member 38 is engaged with a generally cylindrical valve seat member 40 having a cylindrical passage 41, FIG. 4, extending therethrough. Valve seat 40 is mounted in a cylindrical tubular support member 44 which, in turn, is supported in a collar 46 suitably fixed in the bore 14 of the body part 12. Member 44 and collar 46 may be formed as an integral part. Accordingly, closure member 38 is operable to move with respect to valve seat 40 in response to pivotal movement of the arm 32, generally about a pivot point located at the spigot 28, which pivot point is allowed by the relatively thin walled portions 25a and 25b of the body part 12 and which are formed at the recess 25. The elastically deflectable thin walls 25a and 25b formed by the recess 25 provide a suitable support for the arm 32 while allowing movement of the arm to allow suitable displacement of the closure member 38 with respect to the valve seat 40.

Actuator control arm 32 is operable to be moved by an elongated actuator tube or rod member 50, FIGS. 1 through 4, which is suitably secured to the arm 32 adjacent an end portion 32a opposite an end portion 32b wherein end portion 32b includes notch 33 and the recess 36 for supporting the closure member 38. Actuator member 50 is suitably secured to the arm 32 by conventional means, such as an integral collar 50a, FIG. 4, and a threaded portion engaged with a hex nut 53, for example. As shown in FIGS. 1 and 2, the opposite end 50b of actuator tube or rod 50 is anchored to a projection 56 which is suitably secured to the body part 12 at a position spaced substantially from the spigot 28. Actuator member 50 is operable to be heated to cause it to elongate generally in the direction of central axis 11 of the apparatus 10 thereby tending to pivot the arm 32 in a clockwise direction, viewing FIGS. 2 and 4, and to force the closure member 38 tightly against the valve seat 40. Conversely, by reducing the temperature of the actuator member 50, its axial length tends to decrease to pivot the arm 32 in a counter-clockwise direction, viewing FIG. 4, to relax forcible engagement with the closure member 38 whereby fluid flowing through the bore 14 and the tubular member 44 will unseat the ball-type closure member a selected amount in accordance with the position of the arm 32. Actuator member 50 is preferably formed as a rod and more preferably formed as a tube so as to respond to rapid changes in heating effort. Actuator member 50 may be selectively heated by a heater comprising a wire coil conductor 60 wrapped around the actuator member 50, as shown, and operably connected to a source of electrical power included in a control system 62, FIG. 2. Accordingly, by selective controlled heating of the actuator member 50, the arm 32 may be moved to control flow of fluid through the bore 14 and the passage 41, depending on the force tending to keep the closure member 38 seated tightly against the valve seat 40. Those skilled in the art will recognize that comprising the actuator member 50 and wire coil 60 may be replaced by other types of actuator mechanisms such as a solenoid actuator or a piezoelectric type actuator, for example.

The configuration of the recess 25 and the resulting thin wall portions 25a and 25b arranged as shown in FIGS. 3, 4 and 6 provides for elastic deflection of the control arm 32 in a longitudinal direction, that is, generally in the direction of the axis 11 at a desired stiffness. Conversely, deflection of the control arm and the spigot portion 28 in a direction generally normal to the axis 11 is at a different and higher spring rate, for example. Accordingly, the forces required to deflect the control arm 32 and the closure member 38 to control flow through the apparatus 10 are relatively moderate while the control arm 32 resists deflection in other directions to thereby maintain suitable control over the position of the closure member 38.

Referring briefly to FIG. 6, an alternate and preferred embodiment of an actuator control arm and closure member arrangement in accordance with the invention is illustrated. In FIG. 6, a control arm 32c is shown in place of control arm 32 having a first end 32d in which a notch 33a is formed and a second end 32e which is attached to the actuator member 50 in the same manner as the arrangement shown in FIG. 4. However, control arm 32c supports a modified closure member 38a which is of a substantially hemispherical shape and includes a substantially planar surface 38b thereon which is in sliding engagement with a planar surface 33b of control arm 32c. Control arm 32c is preferably provided with a generally cylindrical recess 33c, as shown, of a larger diameter than the diameter of the closure member 38a, and defining the surface 33b. In this way, the closure member 38a is free to slide on surface 33b over a limited distance provided by the recess 33c so as to provide for substantially centering the closure member 38a against valve seat 40. Accordingly, dimensional tolerances associated with the normal position of the control arm 32c relative to the body 12 and the position of the valve seat 40 relative to the body 12 may be accommodated by the ability of the closure member 38a to move at least slightly with respect to the arm 32c to accommodate any misalignment while maintaining a proper position with respect to the valve seat surface 40a, see FIG. 6.

Referring further to FIGS. 2 and 4, the fluid mass flow control apparatus 10 is further characterized by a fluid flow restrictor 66 disposed in the bore 14 between the valve closure member 38 and inlet port 15 of the fitting 16. The flow restrictor 66 may be one of several types including, for example, a porous sintered metal plug, or a body with plural, parallel tubular passages or orifices formed therein. The flow restrictor 66 is suitably fixed within the bore 14, generally in the position shown in the drawing figures.

Figure 5:
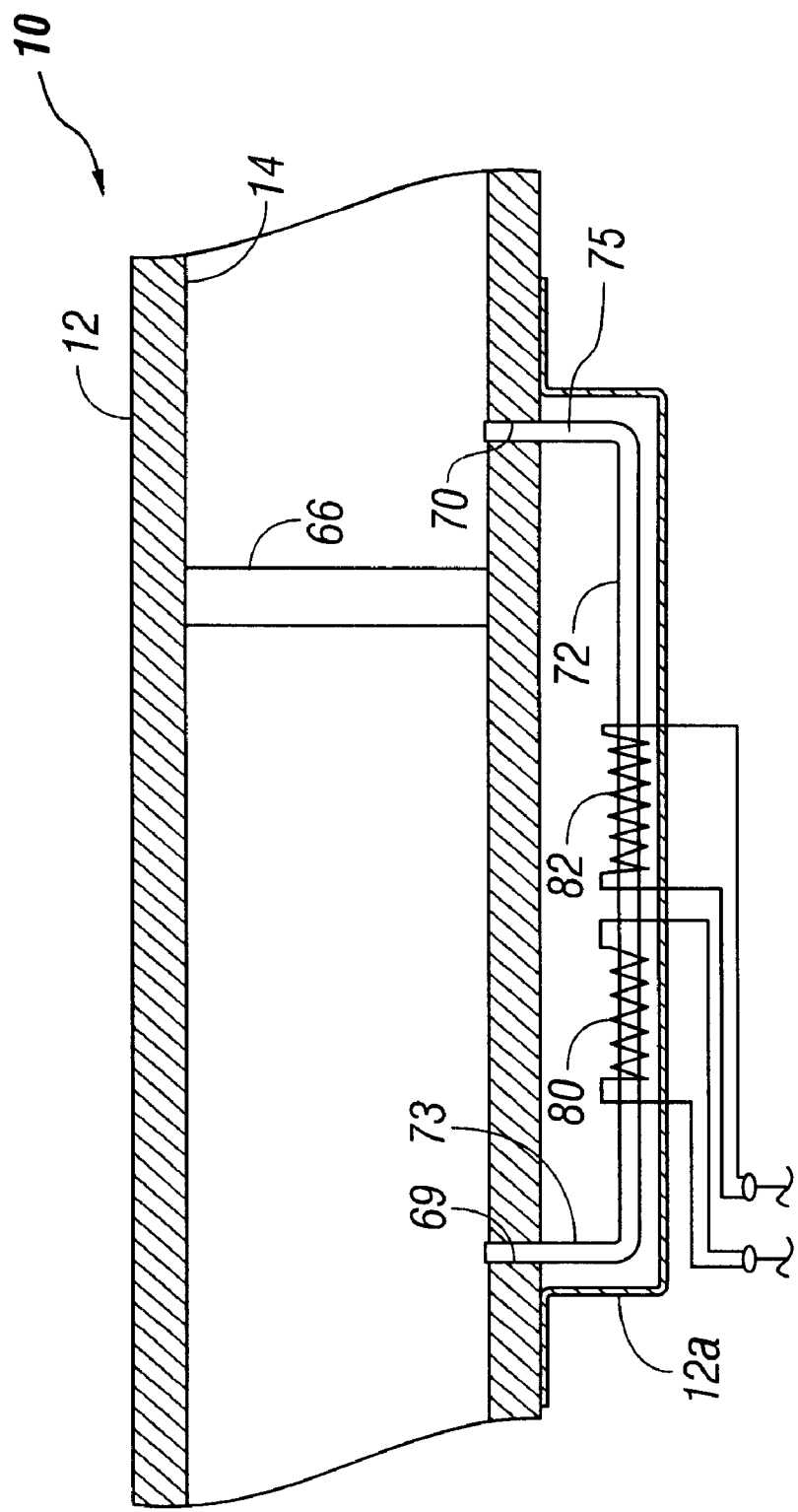
FIG. 5 is a section view taken generally along the line 5—5 of FIG. 3.

Referring further to FIGS. 2 and 5, the fluid mass flow control apparatus 10 is further characterized by fluid mass flow sensor means including, as shown in FIG. 5, spaced apart bores 69 and 70 formed in body part 12 and intersecting bore 14 on opposite sides of the flow restrictor 66. An elongated open ended sensor tube 72, FIG. 5, includes spaced apart transverse legs 73 and 75 which extend through bores 69 and 70, respectively and are secured therein by brazing to form gas tight connections to the body 12. Sensor tube 72 provides for conducting a bypass flow of fluid flowing through the bore 14 around the flow restrictor 66. A removable cover 12a encloses the sensor tube 72, as shown in FIG. 5. The fluid mass flow sensor formed by the sensor tube 72 includes spaced apart upstream and downstream temperature sensitive resistance wire coils 80 and 82 which are suitably electrically connected to the control system 62, FIG. 2. For example, a bridge type electrical circuit, not shown, is operable to be connected to the upstream coil 80 and the downstream coil 82 as circuit elements therein and operable to provide voltages representative of the fluid mass flow rate through the apparatus 10. Further description of the mass flow sensor may be obtained from my U.S. Pat. No. 5,660,207, issued Aug. 26, 1997, the entirety of which is incorporated herein by reference. The mass flow sensor for the apparatus 10 is not believed to require further description. Other forms of mass flow sensors may be used in conjunction with the apparatus 10 and the novel features thereof.

Accordingly, the control system 62 may be operated to control fluid mass flow rates through the apparatus 10 in accordance with a setpoint required by a semiconductor manufacturing process, for example. By sensing the actual fluid mass flow rate across the flow restrictor 66 by the mass flow sensor herein described and shown, the control system 62 may adjust the flow rate through the passage 41 by actuating the thermal actuator comprising the rod or tube 50 and the resistance wire coil 60 to cause the actuator control arms 32 or 32c to move the closure members 38 or 38a in such a way as to throttle the flow of fluid through the passage 41 and to the outlet port 17 at the fitting 18, FIG. 2.

The fluid mass flow control apparatus 10 enjoys several advantages in the art of fluid mass flow controllers. The configuration of the arms 32 and 32c and the body part 12 are such that controlled movement of the arms in a direction parallel with the axis 11 is obtained. The protrusion of the actuator control or pivot arms 32 or 32c into the bore 14 form a clean flow path for fluid flowing through the bore due to the absence of any dead volume in a vertical leg or tee structure, such as with prior art apparatus. The clean flow path provided by the apparatus 10 also reduces purging and drying times required in semiconductor processing gas delivery systems, for example.

The manufacturing cost of the apparatus 10 is reduced as compared with prior art fluid mass flow controllers. The body part 12, for example, may be fabricated from commercially available tubing which has been mechanically and electro polished and is of a type typically used in semiconductor process gas delivery applications. One-half inch diameter tubing available from the Valex Corporation, for example, may be used. The valve seat and closure member may also be of types commercially available. The seat 40 may be a sapphire seat and the closure member 38 may be formed of ruby, for example. The fittings 16 and 18 may be of types commercially available. As mentioned previously solenoid actuators or piezo-electric type actuators may be substituted for the thermal actuator comprising the rod or tube 50 and the resistance type heating coil 60. However, the thermal actuator disclosed herein is also advantageous in that it is independent of the flow of fluid through the apparatus 10. The arrangement of the wire coil 60 wound around the outside of the actuator tube or rod 50 to act as a heating coil in intimate contact with the tube or rod 50 is advantageous. The actuator is thus disposed outside and not influenced by the fluid flowing through the apparatus 10 and is not subject to any cooling effect of the fluid flowing through the apparatus. The wire coil 60 may be of a type commercially available such as Evenohm brand alloy wire which is a type wherein resistance characteristics do not change with temperature over a range of normal operation of the actuator described herein. Alternatively, the wire 60 may be of a type available from California Fine Wire Company, Grover Beach, Calif. as their alloy no. 120, for example. Such wire has a high temperature coefficient of resistance allowing the temperature of the coil to be actively sensed in real time, thus providing additional control benefits. Moreover, the thermal actuator provided by the rod or tube 50 and the wire coil 60 also provides improved response time of the actuator to changes in mass flow rate commanded by the control system 62. In this regard the member 50 is preferably a thin walled tube providing a high surface to mass ratio and more rapid response.

In a typical application of the fluid mass flow control apparatus 10, as illustrated in FIG. 2, a fast acting shutoff valve 99 is preferably interposed the apparatus 10 and a controllable pressure regulator 100. Regulator 100 is connected to a suitable source of gas to be controlled, not shown, and connected to conduit 102. A pressure transducer 101 is in communication with conduit 102 between regulator 100 and valve 99 and is connected to control system 62 for sending signals thereto. Valve 99 may be disposed downstream of apparatus 10 also.

Typically, a fluid mass flow controller of the type used in process gas flow control in semiconductor manufacturing is used to step the flow rate to the process from near zero to a desired flow rate at a desired point in time. A typical sequence used to achieve flow changes requires opening the shutoff valve 99, for example, a few seconds before the desired flow change is required so as to pressurize the upstream side of the fluid mass flow control apparatus 10. This step is carried out, particularly, when the valve 99 is located as shown in FIG. 2. During this time the flow command given to the fluid mass flow control apparatus 10 is zero to minimize any flow through the flow control valve such as provided by the closure member 38 or 38a, the seat 40 and the actuator for the closure member comprising the arm 32 or 32c. When the desired flow change is commanded, the set point command given to the mass flow control apparatus 10 is typically changed from zero to the desired value and the actuator for the arm 32 or 32c is adjusted based on a feedback signal provided by the mass flow sensor until the desired flow is actually achieved and maintained. The sequence of events can be modified to utilize the mass flow control apparatus 10 equipped with a thermal type actuator to achieve nearly instantaneous flow change. The control system 62 may be utilized to maintain and update a table of actuator excitation voltages, currents or temperatures which correspond to a particular flow rate through the apparatus 10.

Accordingly, prior to initiating fluid flow, the shutoff valve 99 is maintained in a closed position and, at a predetermined point in time prior to the point at which actual flow change is desired, a set point command is changed from zero to the desired flow value by the control system 62. This predetermined time is fixed and is sufficient to ensure that the actuator of apparatus 10 has sufficient time to achieve a steady state position prior to the time when the actual flow change is desired. The control system 62 is then operable to cause the actuator formed by the rod or tube 50 and the wire coil 60 to be powered at a voltage, current or temperature that corresponds to the desired flow and the excitation of the actuator during this time is independent of any feedback signal from the mass flow sensor. When the desired time for the flow change arrives and the shut off valve 99 is opened to allow gas to pressurize the apparatus 10 flow through the apparatus is at a rate that is nominally at a desired flow due to pre-positioning of the arm 32 or 32c. The control system 62 is operable to maintain the voltage, current or temperature of the actuator until an adequate time has passed for the mass flow sensor to accurately measure the flow through the mass flow control apparatus 10 and/or the sensed flow reading through the apparatus has stabilized. This predetermined period of time may be actively sensed by the indicated flow rate from the apparatus 10. After this period of time has elapsed the control system 62 converts to relying on a flow feedback signal from the flow sensor to correct and maintain the desired flow.

When the portion of the process where the fluid flow is required at a desired level is complete, a flow command given by the control system 62 to the apparatus 10 may be set to zero. The control system 62 then notes the voltage, current or temperature of the actuator for the apparatus 10 which maintained the desired flow during the process and updates internal tabulated values to be used during the next process cycle.

The construction and operation of the apparatus 10 is believed to be within the purview of one skilled in the art based on the foregoing description. Materials used in constructing the apparatus 10 may be as indicated herein and otherwise in accordance with materials known to those skilled in the art of fluid mass flow controllers for fluids used in the semiconductor manufacturing process industry. Still further, those skilled in the art will recognize that the flow of fluid through the apparatus 10 may be in the opposite direction to that described above while the control valve formed by the actuator arm 32 or 32c and closure member 38 or 38a are still operable to control flow. Also, the mass flow sensor described for the apparatus 10 may be located where described or placed upstream of the valve seat 40 when the flow is in the opposite direction to that shown and described herein above.

Although preferred embodiments of the invention have been described in detail, those skilled in the art will also recognize that various substitutions and modifications may be made without departing from the scope and spirit of the appended claims.

What is claimed is:

1. A fluid flow control apparatus comprising:
   a body part including a central axis, an inlet port, an outlet port, and a flow passage extending therethrough between said ports;
   a valve seat disposed in said flow passage;
   a closure member operable to be engaged with said valve seat;
   an arm engageable with said closure member and connected to said body part in fluid-tight sealed relationship therewith; and
   an expandable actuator operably connected to said arm and operable to expand generally in a direction parallel with said central axis and to move said arm to effect movement of said closure member toward said valve seat upon expansion of said actuator to control flow of fluid through said apparatus.

2. The apparatus set forth in claim 1 wherein:
   said body part comprises a generally cylindrical tube having a reduced thickness wall portion adjacent a point of connection of said arm to said body part and elastically deflectable in response to operation of said actuator to allow said arm to move said closure member.

3. The apparatus set forth in claim 2 wherein:
   said arm projects through a bore formed by a spigot portion of said body part adjacent said reduced thickness wall portion.

4. The apparatus set forth in claim 3 wherein:
   said arm is secured to said spigot portion by one of welding and brazing.

5. The apparatus set forth in claim 1 wherein:
   said actuator comprises a thermal type actuator.

6. The apparatus set forth in claim 5 wherein:
   said actuator comprises an elongated member formed of a material responsive to temperature change to elongate and contract.

7. The apparatus set forth in claim 6 wherein:
   said actuator includes a heating element in operable engagement with said elongated member to affect a change in temperature of said elongated member to move said arm to change the position of said closure member.

8. The apparatus set forth in claim 6 wherein:
   said elongated member comprises one of a rod and tube extending generally parallel to a longitudinal axis of said body part, said elongated member is fixed at one end with respect to said body part and is connected at another end to said arm.

9. The apparatus set forth in claim 1 including:
   a flow restrictor interposed said closure member and said inlet port.

10. The apparatus set forth in claim 1 including:
    a fluid mass flow sensor in fluid flow communication with said flow passage for sensing mass flow of fluid through said apparatus.

11. The apparatus set forth in claim 1 including:
    a control system operably connected to said actuator for effecting movement of said closure member to control the flow of fluid through said apparatus.

12. The apparatus set forth in claim 11 including:
    a fluid shut off valve operably connected to said control system and in fluid flow communication with said apparatus and operable to shut off flow of fluid through said apparatus.

13. The apparatus set forth in claim 1 wherein:
    said arm includes a portion thereof forming a recess for engagement with said closure member and said closure member comprises a spherical ball disposable in said recess and engageable with said valve seat.

14. The apparatus set forth in claim 1 wherein:
    said arm includes a planar surface formed thereon and said closure member includes a cooperating planar surface engageable with said planar surface on said arm and moveable relative to said arm to align said closure member with said valve seat.

15. The apparatus set forth in claim 14 wherein:
    said planar surface on said arm is formed by a recess on said arm for receiving at least a portion of said closure member.

16. A fluid mass flow control apparatus comprising:
    a body part including an inlet port, an outlet port, and a flow passage extending therethrough between said ports, said body part being formed of a tube having an elastically deflectable wall portion;
    a valve seat in said flow passage;
    a closure member operable to be engaged with said valve seat;
    an arm engageable with said closure member and connected to said body part in fluid-tight sealed relationship therewith, said arm projecting through a bore formed by a portion of said body part adjacent said wall portion; and an expandable actuator operably engaged with said arm for moving said arm to effect movement of said closure member toward said valve seat upon expansion of said actuator.

17. The apparatus set forth in claim 16 wherein:

said actuator comprises an elongated member formed of a material responsive to temperature change to elongate and contract; and said apparatus includes a heating element in operable engagement with said elongated member to affect a change in temperature of said elongated member to move said arm to change the position of said closure member.

18. The apparatus set forth in claim 17 wherein:

said elongated member comprises one of a rod and tube extending generally parallel to a longitudinal axis of said body part, said elongated member is fixed at one end with respect to said body part and is connected at another end to said arm.

19. The apparatus set forth in claim 16 wherein:

said arm includes a portion thereof forming a recess for engagement with said closure member and said closure member comprises a spherical ball disposable in said recess and engageable with said valve seat.

20. The apparatus set forth in claim 16 wherein:

said arm includes a planar surface formed thereon and said closure member includes a cooperating planar surface engageable with said planar surface on said arm and moveable relative to said arm to align said closure member with said valve seat.

21. The apparatus set forth in claim 20 wherein:

said planar surface on said arm is formed by a recess on said arm for receiving at least a portion of said closure member.

22. A method for controlling fluid mass flow to a process comprising:

providing a fluid mass flow control apparatus including an arm, an expandable actuator operably connected to a first end of said arm, a fluid mass flow control valve operably connected to a second end of said arm, a valve seat for engaging said fluid mass flow control valve, a control system operably connected to said actuator, a sensor operably connected to said control system for sensing mass flow of fluid through said apparatus, and a shutoff valve operably connected to said apparatus for controlling flow of fluid thereto;

closing said shutoff valve;

changing a set point command of said control system from zero to a desired fluid mass flow rate through said apparatus at a predetermined time sufficient to ensure that said actuator has sufficient time to achieve a steady state position of said fluid mass flow control valve prior to the time when actual fluid mass flow is desired at said process;

causing said actuator to expand, thereby moving said fluid mass flow control valve toward said valve seat to effect control of fluid flow through said apparatus in accordance with said desired fluid mass flow rate;

opening said shutoff valve and allowing fluid to flow to said apparatus; and causing fluid to flow through said apparatus at a rate which is nominally said desired fluid mass flow rate as determined by prepositioning of said actuator.

23. The method set forth in claim 22 comprising:

maintaining said fluid mass flow rate through said apparatus until a predetermined time has passed for said sensor to accurately measure fluid mass flow through said apparatus.

24. The method set forth in claim 22 comprising:

causing said control system to maintain a desired fluid flow rate through said apparatus based on a signal received from said sensor; and causing said shutoff valve to close when fluid flow at said desired fluid flow rate is complete.

25. The method set forth in claim 22 comprising:

causing said control system to record data related to said actuator which maintained said desired fluid flow rate during said process.

26. The apparatus set forth in claim 1 wherein said arm is operable to permit movement in a direction generally parallel with said central axis, but resist movement in directions generally non-parallel with said central axis.

* * * * *